Jan. 21, 1964  J. KUHN  3,118,467
AUTOMATIC CHECK VALVE
Filed Feb. 23, 1961
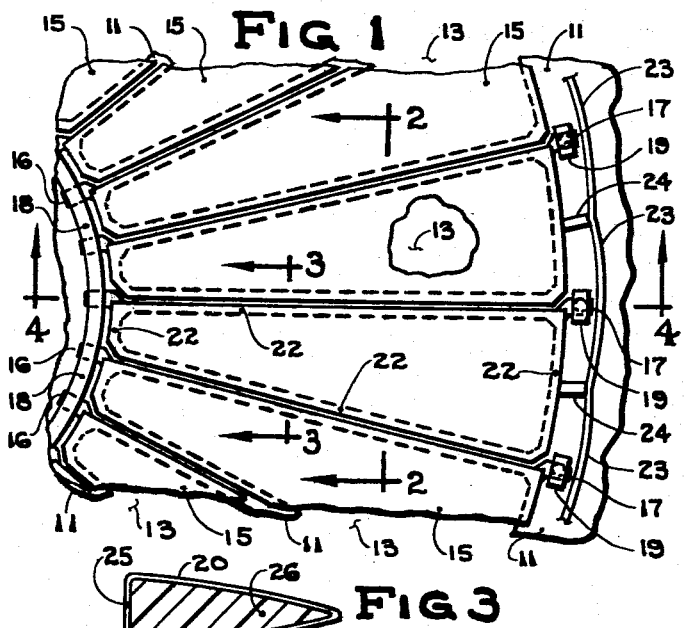
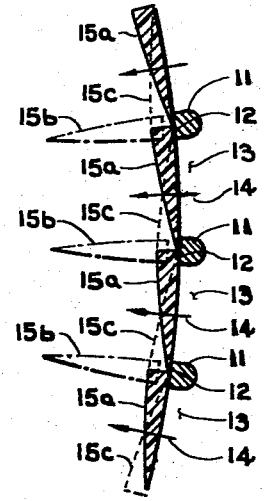
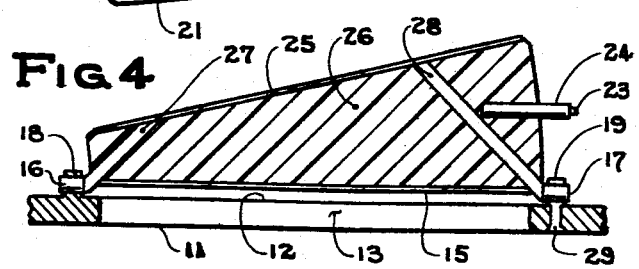
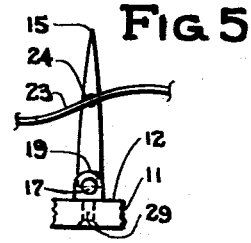
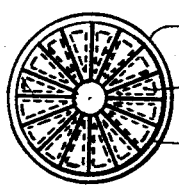
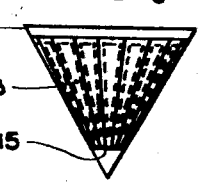
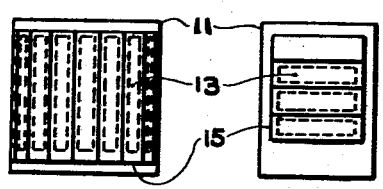
*INVENTOR.*
John Kuhn United States Patent Office 3,118,467
Patented Jan. 21, 1964

3,118,467
AUTOMATIC CHECK VALVE
John Kuhn, 556 Swarthmore Ave.,
Pacific Palisades, Calif.
Filed Feb. 23, 1961, Ser. No. 91,284
7 Claims. (Cl. 137—512.1)

This invention relates to automatic check valves and in particular to such valves utilizing pivoted vanes to prevent reverse flows and has special application to such devices where potential flow reversals occur at high frequencies.

Invention resides in permitting each vane to rotate through substantially 180° from sealing off one flow passage to sealing off an adjacent flow passage without intermediate mechanical stoppage, as well as in shaping the vanes to cooperate with the supporting valve structure in reducing resistance to flow in the forward direction, in relating the polar mass moment of inertia of the vanes to the flow characteristics of the fluid to be valved, in constructing the vane of certain types of composite structures, and in the synchronizing means for coordinating the motion of the vanes and for assisting their closing.

A very considerable economy could be obtained in reciprocating compressors if the automatic valves commonly employed did not result in serious losses in volumetric efficiency, pressure efficiency, and service life; particularly as the reciprocating speed is increased. These limitations have restricted the application of this device in competition with other methods of compression.

It is an object of the present invention to provide an automatic check valve that will require a minimum of clearance volume so that the volumetric efficiency of a reciprocating compressor using it may be made almost perfect.

Another object of the present invention is to provide an automatic check valve having a very low resistance to forward flow through it so that the pressure rise efficiency of a reciprocating compressor using it may be made almost perfect.

Another object of the present invention is to provide an automatic check valve in which the moving parts are subject to a minimum of mechanical shock due to sudden stoppage, are structurally resistant to torsion and bending forces induced either by seating and pressure forces or by fluid flow past these parts, and strongly damp any vibrations induced in these parts by shocks or fluid flow; so that the service life of the valve may be long.

A further object of the present invention is to provide a valve in which the objectives just described have been attained to the degree that flow reversals of very high frequency can be controlled, permitting the operating speed of a using compressor to be increased to the working limit of its other parts.

Still another object of the present invention is to provide an automatic check valve which can be manufactured at low cost and easily installed into a reciprocating compressor cylinder head (which head usually has a conical shape for structural reasons).

Further objects and advantages will be aparent from the following specifications and appended claims.

Reference is directed to the accompanying drawing in which

FIGURE 1 of the drawing is a fragmentary view of a conical valve construction according to the present invention looking normal to the conical surface along the line 4—4.

FIGURE 2 is a fragmentary sectional view taken from the line 2—2 of FIGURE 1.

FIGURE 3 is a sectional view of the vane only taken from the line 3—3 of FIGURE 1.

FIGURE 4 is a sectional view taken from the line 4—4 of FIGURE 1 but with the vane rotated to the full open position and the cutting plane thru the valve structure shifted to the passage between ends of the vane.

FIGURE 5 is an end view of FIGURE 4.

FIGURE 6 is an overall, semi-diagrammatic view of a flat, disk-shaped valve construction according to the present invention.

FIGURE 7 is an overall, semi-diagrammatic view of a conical valve construction according to the present invention.

FIGURE 8 is an overall, semi-diagrammatic view of a cylindrical valve construction according to the present invention.

FIGURE 9 is an overall, semi-diagrammatic view of a flat, rectangular valve construction according to the present invention.

Referring now generally to the drawing, the valve constructions according to the present invention are shown with various forms of conical valve surfaces (or valve seats) having an array of passages piercing the surface. The vanes employed in this valve construction are pivotted about an edge in bearings aligned on opposite sides of the passages. Each of the passages and vanes are identical so that the vanes can obstruct reverse flow through either of the adjacent passages by sealing to the valve surface. The valve surface can be circular or polygonal in cross section normal to the conical axis, and it can be internal or external to the valve. The description which follows of FIGURES 1 through 5 will be related to an arrangement of vanes internal to a circular conical valve surface. Nothing in this description, however, should be construed to limiting the present invention to only conically surfaced valves.

Proceeding to the more specific description of the valve construction shown in FIGURES 1 through 5, the valve structure 11 has a conical internal surface 12 pierced by a regular array of identical passages 13 through which a fluid can flow in the forward direction indicated by the arrow 14. Reverse flow is prevented by the identical vanes 15. These vanes can rotate through almost half a circle; as indicated by one closed position 15a, full open position 15b, and the other closed position 15c. The vanes are pivotted about an edge on journals 16 and 17 in bearings 18 and 19, respectively. The bearings are aligned along opposite sides of the passages intermediate to each two passages. The surfaces 20 and 21 of the vanes conform to the valve seat surface 12 and these vane surfaces extend beyond the passage, as shown by the overlap 22, so that the vanes can seal off the passages in either extreme position against reverse flow. The journals are a loose fit in the bearings so as not to restrain the vane from seating to the valve surface. Coordinated rotation of all the vanes in the same sense is secured by the elastic ring 23 which is joined to each vane through the rotatable pin 24.

It will be noted that the vanes, their bearings, and their synchronizing mechanism do not protrude inside the surface 12 by any large amount. As a result, the clearance space between a piston inside these vanes and the valve surface can be made quite small. The volumetric efficiency of a compressor improves rapidly with small decreases in clearance space so that, by reducing this space toward zero with the present invention, the volumetric efficiency can be made nearly perfect. As a result, a compressor using the present invention can be built smaller, lighter, and cheaper than compressors of similar capacity but using older types of automatic check valves which required larger clearance spaces between the piston and the valve surface.

It may also be noted that the vanes cooperate with the structure to present a streamlined airfoil shape to a fluid flowing in the forward direction 14. In addition, the flow passage area is the major portion of the total valve area. There is, as a result, little resistance to forward flow and so only a small pressure drop across the valve. The pressure drop remains small, due to the minor fraction of the valve area obstructed by the streamlined shapes, to high flow velocities. Thus, for the same total area as occupied by older types of automatic check valves, the present invention permits a much higher flow rate at a lower pressure drop. As a result a compressor using this present invention can be built still smaller, lighter, and cheaper than compressors using older types of automatic check valves with their inherent limitations on compressor operating speeds.

A very large advantage in service life is also to be found in compressor valves constructed according to the present invention. Such compressor valves are subjected to forward flows that increase sharply to a maximum and then diminish slowly but at an increasing rate to a rapid stop at top center. It can be shown that under these conditions and if the vanes and their linkage have a mass less than a certain small multiple of the weight of the fluid flowing past them at each stroke of the compressor, the vanes will accelerate from one valve seat to a maximum speed of rotation in about a sixth of a circle and then decelerate to just come to rest at the end of a half circle against the adjacent seat. This action is extremely valuable in avoiding hammering of the vane on the valve seats with consequent damage to the vanes and the bearings and linkage. To meet these minimum weight requirements, however, solid vanes would have to be too thin to resist the reverse pressure forces or the forward flow fluttering forces. A preferred embodiment is shown in FIGURES 3 and 4. A thin metallic shell 25 is filled with foamed plastic 26. Lightweight members 27 and 28 are welded to the shell and have journals 16 and 17, respectively, machined on their ends. In this manner, the vane can be made sufficiently light in weight to secure the desired motion while being sufficiently resistant to bending and torsional forces. In addition, the foamed plastic filling acts to absorb and damp out vibrations induced by shock and by flowing fluids, so that the fatigue resistance is greatly improved over a solid vane construction. The light weight of the vane also minimizes the operating pressures and the bearing loads so that the forward flow resistance is decreased at the same time that the bearing life is increased. The combination, of operating without severe mechanical impact when stopping on the adjacent seat, the resistance to bending and torsion, the ability to damp vibrations, and the low bearing loads, all add up to much longer operating life than have been found in older types of automatic check valves. These characteristics also permit a radical increase in the frequency of the compressor over that possible with the older types of automatic check valves.

For high temperature environments, various metallic equivalents can be substituted for the foamed plastic. The shears from pressure and flow forces can be carried, for example, by honeycomb webs normal to or corrugated sheets parallel to and bonded to the surfaces 20 and 21. The resultant structure is itself capable of strongly damping the vibrations from a major portion of anticipated exciting forces. Additional damping can be furnished by packing the interstices of this structure with metallic fiber felts. These felts need not be bonded to the structure.

These advantages may be secured without any large sacrifice in manufacturing cost with the present construction. The conical surface 12 is a simple machining operation. Bearing 18 may be a ridge on this surface as shown or a separate ring (later attached to the surface) in which holes are drilled to receive journals 16. Bearings 19 are made separately, to facilitate assembly of the vanes, and attached by integral rivets 29. The shells 25 can be coined to shape by the dies used in clamping the shell to members 27 and 28 during the welding process. The pins 24 are a loose fit to the shells and to the plastic fillings to permit free rotation. The link 23 is a continuous wire ring projection welded to the pins 24. This ring is buckled during assembly into a scalloped form, as in FIGURE 1, or into a sinusoidal wave form, as in FIGURE 5, or into any other simple shape. As the vanes rotate to open, the pins move inward from a conical surface so that the distance between the pins becomes shorter, the ring buckles further, and an elastic columnar spring force is exerted by the ring to push the vanes back onto their seats. This push is too weak to interfere with checking operation but is sufficient to keep the valves normally closed and assist in reducing valve chatter. The link cannot buckle enough, however, to let adjacent vanes bang together. The use of a thin elastic ring for this purpose also avoids the need for a swivel joint between the linkage and the pins to compensate for angular misalignment as the vane rotates. This triple function of the ring 23 eliminates a large number of springs, links, and joints, which would not only add to the manufacturing cost but also to the volume and pressure losses and reduce the service life.

Although my invention has been disclosed as related more particularly to a certain type of valve geometry and construction, variations may be effected in the structure and use thereof without departing from the spirit of the claims. Various modifications may suggest themselves to those skilled in the art without departing from the spirit of my invention and hence, I do not wish to be restricted to the specific form shown or the uses mentioned, except to the extent indicated in the appended claims.

I claim:

1. In an automatic check valve, the combination comprising: a structure having a conical surface and having a plurality of passages opening on the surface in a circular array of similar and equally spaced holes and having a bearing located midway between each pair of holes and aligned parallel with the surface, a plurality of vanes with a vane rotatably mounted in each of the bearings and adapted for rotation to and seating on the surface and sealing the hole alternatively on either side of the bearing, synchronizing means for securing rotation in the same sense of all the vanes simultaneously, and closing means for urging the vanes into either closed position.

2. The invention as defined in claim 1 wherein the synchronizing means and the closing means are combined in a combination comprising: an elastic ring, a bearing in each vane and aligned parallel to the axis of rotation of the vane, a plurality of pins fixed to the ring and rotatably mounted in the bearings in the vanes; the conical arrangement of the vanes causing a change in the distance between the pins as the vanes rotate and the resultant columnar spring forces in the ring acting to urge the vanes into either closed position.

3. The invention as defined in claim 1 wherein the structure adjacent to the passages is rounded convexly to the surface and the vanes are substantially semilenticular in shape perpendicular to their axes of rotation and the holes are spaced a distance apart substantially equal to the thickness of the vane so that the structure and the vanes cooperate to form a streamlined shape to flows in the forward direction.

4. The invention as defined in claim 1, in which said vane rotatably mounted in each of the bearings includes a journal about which the vane can rotate in a bearing, two plates proceeding from the journal on the same side, a shear resistant member between and bonded to the plates and having a density (averaged over the volume between the plates) less than the density of the plates, and a vibration absorbing means for damping motions of the structure other than rotation as a rigid body around the journal.

5. The invention as defined in claim 4 wherein said member is composed of a foamed viscoelastic material and also acts as the vibration absorbing means.

6. The invention as defined in claim 4 wherein said member is a truss construction and bonded at discrete points to the plates and in rubbing contact with the plates between these points so as to act as the vibration absorbing means.

7. The invention as defined in claim 1 when used to admit synchronous forward flows of a fluid wherein the weight of each vane is less than a certain small multiple of the weight of the fluid flowing thru an adjacent hole during one such flow.

References Cited in the file of this patent

UNITED STATES PATENTS

| | | |
|---|---|---|
| 505,238 | Smith | Sept. 19, 1893 |
| 2,461,304 | Wilson | Feb. 8, 1949 |

FOREIGN PATENTS

| | | |
|---|---|---|
| 26,783 | Great Britain | Nov. 18, 1909 |